United States Patent
Ando et al.

(10) Patent No.: US 9,118,080 B2
(45) Date of Patent: Aug. 25, 2015

(54) LEAD-ACID BATTERY

(71) Applicant: PANASONIC CORPORATION, Osaka (JP)

(72) Inventors: Kazunari Ando, Aichi (JP); Kohei Suzuki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/358,028

(22) PCT Filed: Sep. 21, 2012

(86) PCT No.: PCT/JP2012/006021
§ 371 (c)(1),
(2) Date: May 13, 2014

(87) PCT Pub. No.: WO2013/073091
PCT Pub. Date: May 23, 2013

(65) Prior Publication Data
US 2015/0140430 A1 May 21, 2015

(30) Foreign Application Priority Data
Nov. 17, 2011 (JP) .................................. 2011-251330

(51) Int. Cl.
| | | |
|---|---|---|
| *H01M 4/73* | (2006.01) | |
| *H01M 4/14* | (2006.01) | |
| *H01M 10/14* | (2006.01) | |
| *H01M 4/62* | (2006.01) | |
| *H01M 4/20* | (2006.01) | |
| *H01M 4/56* | (2006.01) | |
| *H01M 10/12* | (2006.01) | |

(52) U.S. Cl.
CPC *H01M 4/73* (2013.01); *H01M 4/14* (2013.01); *H01M 4/20* (2013.01); *H01M 4/624* (2013.01); *H01M 10/14* (2013.01); *H01M 4/56* (2013.01); *H01M 10/12* (2013.01); *Y02E 60/126* (2013.01)

(58) Field of Classification Search
CPC .......... H01M 4/14; H01M 4/16; H01M 4/18; H01M 4/20; H01M 4/21; H01M 4/22; H01M 4/23; H01M 4/56; H01M 4/57; H01M 4/72; H01M 4/73; H01M 4/74; H01M 4/742; H01M 4/745; H01M 4/747
See application file for complete search history.

(56) References Cited

U.S. PATENT DOCUMENTS

| | | | |
|---|---|---|---|
| 4,782,585 A * | 11/1988 | Kobayashi et al. | .......... 29/623.5 |
| 5,958,625 A | 9/1999 | Rao | |
| 6,579,646 B2 * | 6/2003 | Yoshihara et al. | ............ 429/233 |

FOREIGN PATENT DOCUMENTS

| | | |
|---|---|---|
| JP | 05-174825 A | 7/1993 |
| JP | 11-339788 A | 12/1999 |

(Continued)

OTHER PUBLICATIONS

Chinese Search Report issued in Chinese Application No. 201280055796.X dated Sep. 29, 2014 in English Translation.

(Continued)

*Primary Examiner* — Carlos Barcena
(74) *Attorney, Agent, or Firm* — McDermott Will & Emery LLP

(57) ABSTRACT

A lead-acid battery of the present invention includes electrode plate units, each including a positive electrode plate, a negative electrode plate, and a separator. The positive electrode plate is a positive electrode grid filled with paste including powder of lead oxide as a main component. The negative electrode plate is a negative electrode grid filled with paste including powder of lead oxide as a main component, and including carbon black. The positive electrode plate faces the negative electrode plate. The separator is provided between the positive electrode plate and the negative electrode plate. The positive electrode grid includes gates, each being generally diamond-shaped, and being more than or equal to 50 mm$^2$ and less than or equal to 100 mm$^2$ in area. The carbon black has a DBP oil absorption of more than or equal to 140 ml/100 g and less than or equal to 340 ml/100 g.

8 Claims, 2 Drawing Sheets

(56) References Cited

FOREIGN PATENT DOCUMENTS

| | | |
|---|---|---|
| JP | 2002-063905 A | 2/2002 |
| JP | 2006-196191 A | 7/2006 |
| JP | 2007-018820 A | 1/2007 |
| JP | 2007-273367 A | 10/2007 |

OTHER PUBLICATIONS

International Search Report issued in International Application No. PCT/JP2012/006021 with Date of mailing Oct. 30, 2012, with English Translation.

* cited by examiner

LEAD-ACID BATTERY

RELATED APPLICATIONS

This is the national phase of International Application No. PCT/JP2012/006021, with an international filing date of Sep. 21, 2012, which claims priority of Japanese Patent Application No. 2011-251330, filed on Nov. 17, 2011, the contents of each of which are hereby incorporated by reference.

TECHNICAL FIELD

The present invention relates to lead-acid batteries, more particularly to a lead-acid battery including electrode plate units, each including a positive electrode plate, a negative electrode plate, and a separator. The positive electrode plate is a positive electrode grid filled with paste including powder. The main component of this powder is lead oxide. The negative electrode plate is a negative electrode grid filled with paste including powder and carbon black. The main component of this powder is lead oxide. The separator is provided between the positive electrode plate and the negative electrode plate.

BACKGROUND ART

There is a constant demand for economical lead-acid batteries with high durability, which serve as starter batteries for automobiles. Such a lead-acid battery includes a battery box including a plurality of cell compartments. Each of the cell compartments includes an electrode plate unit including a positive electrode plate, a negative electrode plate, and a separator. The positive electrode plate is a positive electrode grid filled with paste of lead suboxide powder. The negative electrode plate is a negative electrode grid filled with paste of lead suboxide powder and carbon black. The separator is provided between the positive electrode plate and the negative electrode plate. The abutting electrode plate units are connected in series. The level of an electrolyte poured into the battery box is higher than that of the electrode plate unit. A lid is closed to seal the battery box.

For a long-life lead-acid battery, the negative electrode plate often includes a conductive agent such as carbon black to improve the charge acceptance of the negative electrode plate. In addition, the conductivity depends on the surface area and the amount of the carbon black. The surface area of the CB is often measured with the amount of dibutyl phthalate (DBP) oil absorption.

PATENT DOCUMENTS 1-4 disclose that a negative electrode plate includes carbon black having a large amount of DBP oil absorption (or a large specific surface) to make a long-life lead-acid battery. In particular, PATENT DOCUMENTS 2 and 4 disclose in detail that the CB and a lignin compound are used together to improve the charge acceptance of the negative electrode plate. This CB has a DBP oil absorption of 100-300 ml/100 g or 450-550 ml/100 g. The lignin compound is approximately 0.1-0.6 mass percent relative to a negative electrode active material.

CITATION LIST

Patent Document

PATENT DOCUMENT 1: Japanese Unexamined Patent Publication No. H05-174825
PATENT DOCUMENT 2: Japanese Unexamined Patent Publication No. 2002-063905
PATENT DOCUMENT 3: Japanese Unexamined Patent Publication No. 2006-196191
PATENT DOCUMENT 4: Japanese Unexamined Patent Publication No. 2007-273367

SUMMARY OF THE INVENTION

Technical Problem

However, it has been found that the lead-acid battery does not work effectively under certain conditions. For example, the lead-acid battery with the techniques of PATENT DOCUMENTS 1-4 does not start the engine of the vehicle that has been left under a relatively low SOC for a long time. It is an object of the present invention to provide a lead-acid battery that is so excellent in discharging under severe conditions as to start an engine of a vehicle that has been left for a long time.

Solution to the Problem

To solve the above problem, the lead-acid battery of the present invention includes electrode plate units, each including a positive electrode plate, a negative electrode plate, and a separator. The positive electrode plate is a positive electrode grid filled with paste including powder of lead oxide as a main component. The negative electrode plate is a negative electrode grid filled with paste including powder of lead oxide as a main component, and including carbon black. The positive electrode plate faces the negative electrode plate. The separator is provided between the positive electrode plate and the negative electrode plate. The positive electrode grid includes gates, each being generally diamond-shaped and being more than or equal to 50 mm$^2$ and less than or equal to 100 mm$^2$ in area. The carbon black has a DBP oil absorption of more than or equal to 140 ml/100 g and less than or equal to 340 ml/100 g.

The amount of DBP oil absorption can be measured according to the method of JIS K6221 (1982) 6.1.2.A. The term "main component" means that the component occupies more than or equal to 50%. The term "generally diamond-shaped" covers not only a strict diamond shape, but also a shape termed a diamond shape in an expanded metal. Specifically, the term means a shape of an expanded metal including a bonding portion that is regarded as not a side but an angle.

The positive electrode grid may include gates, each being generally diamond-shaped and being more than or equal to 65 mm$^2$ and less than or equal to 85 mm$^2$ in area.

The carbon black may have a DBP oil absorption of more than or equal to 150 ml/100 g and less than or equal to 200 ml/100 g.

The carbon black may be more than or equal to 0.05 mass percent and less than or equal to 0.7 mass percent relative to a negative electrode active material.

The carbon black may be more than or equal to 0.1 mass percent and less than or equal to 0.5 mass percent relative to a negative electrode active material.

The level of an electrolyte may be higher than that of the electrode plate unit.

Advantages of the Invention

The lead-acid battery of the present invention is a long-life lead-acid battery for vehicles. This lead-acid battery that has been left for a long time after a repeat of a start of the engine can still start the engine. This lead-acid battery has excellent discharge characteristics under server conditions.

BRIEF DESCRIPTION OF THE DRAWINGS

FIG. 1 illustrates a main portion of a lead-acid battery of an embodiment.

[FIG. 2]

DESCRIPTION OF EMBODIMENTS

Figure 1:
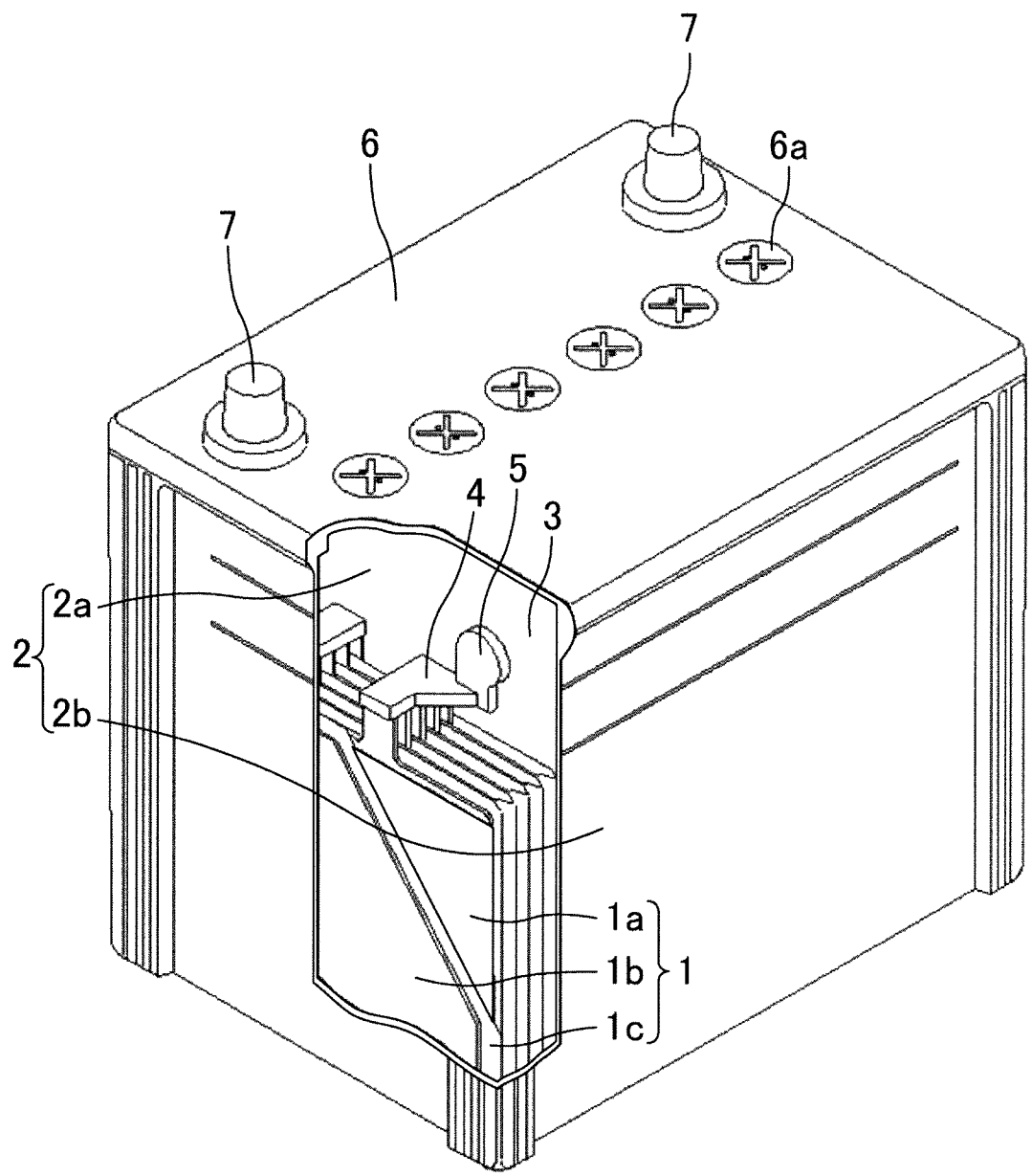
[FIG. 1]

Before an embodiment, the story behind the present invention will be described.

A negative electrode plate with an appropriate amount of carbon black that has a large amount of DBP oil absorption (or a high conductivity) surely has an improved charge acceptance, and lengthens the life of a lead-acid battery. However, it has been found that a lead-acid battery including such a negative electrode plate combined with a positive electrode plate produced at random does not obtain desirable discharge characteristics under special, severe conditions. For example, this battery that has been left under a relatively low SOC for a long time cannot start a vehicle. The inventors have found a cause of such a disadvantage, and made the present invention. The following is the detailed descriptions of its mechanisms etc.

Lithium ion secondary batteries or nickel hydrogen storage batteries include paste of an active material. This paste includes a thickener such as polyvinylidene fluoride (PVDF) or carboxymethyl cellulose (CMC). Thus, this paste has a high flowability and is convenient for filling and applying. In other words, a current collector includes the active material having a small variability per unit area. In contrast, lead-acid batteries include a positive electrode plate with paste of lead suboxide powder, purified water, and dilute sulfuric acid. The main component of the lead suboxide powder is lead oxide. This paste does not include a thickener while only including, e.g., acrylic resin fiber or polyethyleneterephthalate (PET) resin fiber. Thus, this paste has a low flowability as plaster does, and is inconvenient for filling and applying. In other words, a current collector includes the active material having has a large variability per unit area.

The lead-acid battery includes positive electrode plates and negative electrode plates. These positive electrode plates and negative electrode plates are made from positive electrode grids and negative electrode grids, respectively. These positive electrode grids and negative electrode grids are made of a lead or a lead alloy. Each grid includes an upper frame and a mesh. The upper frame includes an edge connected with a strap. The mesh includes a plurality of gates that are generally diamond-shaped. The positive electrode plates and the negative electrode plates include this mesh filled with the above paste.

As described above, the paste on the positive electrode of the lead-acid battery has a lower flowability than those of the other batteries have. Thus, the paste is inconvenient for filling. It is very difficult to appropriately apply such paste on a grid including excessively small gates (small spaces) or a grid including excessively large gates (large spaces). The amount of the active material (lead suboxide powder) per unit area of the positive electrode plate filled with the paste under such conditions varies in the inside of a single gate or over multiple gates.

PATENT DOCUMENTS 1-4 disclose that the carbon black having a large amount of DBP oil absorption and a high conductivity and the lignin in an appropriate amount not only improve the charge acceptance of the negative electrode plate, but also form a uniform conductive network, thereby reducing the resistance to a charge transfer, and improving the responsivity to discharging.

In contrast, the positive electrode plate with an excessively small or excessively large gate area is unable to distribute the active material equally. Thus, such a positive electrode plate has a stronger resistance to a charge transfer than the above improved negative electrode plate does.

In this situation, the inventors have found the following. The lead-acid battery with the above improved negative electrode plate is a long-life battery. However, this battery on a vehicle that has been left for a long time from a certain low SOC might generate a dark current discharge (a discharge of an extremely weak current for maintaining a memory in a device). In this case, an uneven distribution of the active material in the positive electrode plate produces a significant effect. This is because the positive electrode plate and the negative electrode plate show an uneven distribution of a charging/discharging reaction, i.e., because lead sulfate ($PbSO_4$), which is a reaction product, is unevenly generated on certain portions of the positive electrode plate and the negative electrode plate.

Specifically, the inside of the positive electrode plate has a portion of a high weight ratio of the positive electrode grid (i.e., a portion of a low weight ratio of the active material). In this portion, the dark current discharge reaction proceeds more smoothly than in the other portions. Thus, this portion serves as a strong resistance, thereby preventing a start of the engine. Such an effect is unable to be found without exposing the lead-acid battery to the dark current discharge for a long time. This lead-acid battery includes the carbon black having a DBP oil absorption of 140-340 ml/100 g, and thus includes the negative electrode plate having an improved charge acceptance.

From this finding, the inventors have studied a positive electrode grid convenient for a uniform filling of an active material paste for the positive electrode plate. Then, they have found that a mesh including gates, each being 50-100 $mm^2$ in area, preferably 65-85 $mm^2$ allows the positive electrode plate to have a great uniformity of filling of paste and a small distribution variability of an active material. This finding provides a long-life lead-acid battery that is able to start an engine even when exposed to the dark current discharge for a long time after the SOC has been reduced by a repeat of a start of the engine.

The carbon black having a DBP oil absorption of 150-200 ml/100 g is more advantageous. The carbon black having a DBP oil absorption of more than or equal to 150 ml/100 g makes the charge acceptance of the negative electrode plate high. The carbon black having a DBP oil absorption of less than or equal to 200 ml/100 g keeps the structure of the active material solid. Accordingly, the life characteristics are further improved.

The carbon black of 0.05-0.7 mass percent, preferably 0.1-0.5 mass percent relative to the negative electrode active material is more advantageous. The amount of more than or equal to 0.05 mass percent makes the charge acceptance of the negative electrode plate high. The amount of less than or equal to 0.7 mass percent keeps the structure of the active material solid. Accordingly, the life characteristics are further improved.

Moreover, the so-called liquid electrolyte lead-acid battery is more advantageous. The level of an electrolyte of this liquid electrolyte lead-acid battery is higher than that of the electrode plate unit so that the whole electrode plate unit is soaked in the electrolyte. The liquid electrolyte lead-acid battery (as a starter battery for, in particular, an idle reduction vehicle) has many opportunities to repeat a large current discharge such as a start of the engine and to reduce the SOC. This battery that is mounted on a vehicle also has many opportunities to be exposed to a dark current discharge.

(Embodiment)

Figure 2A:
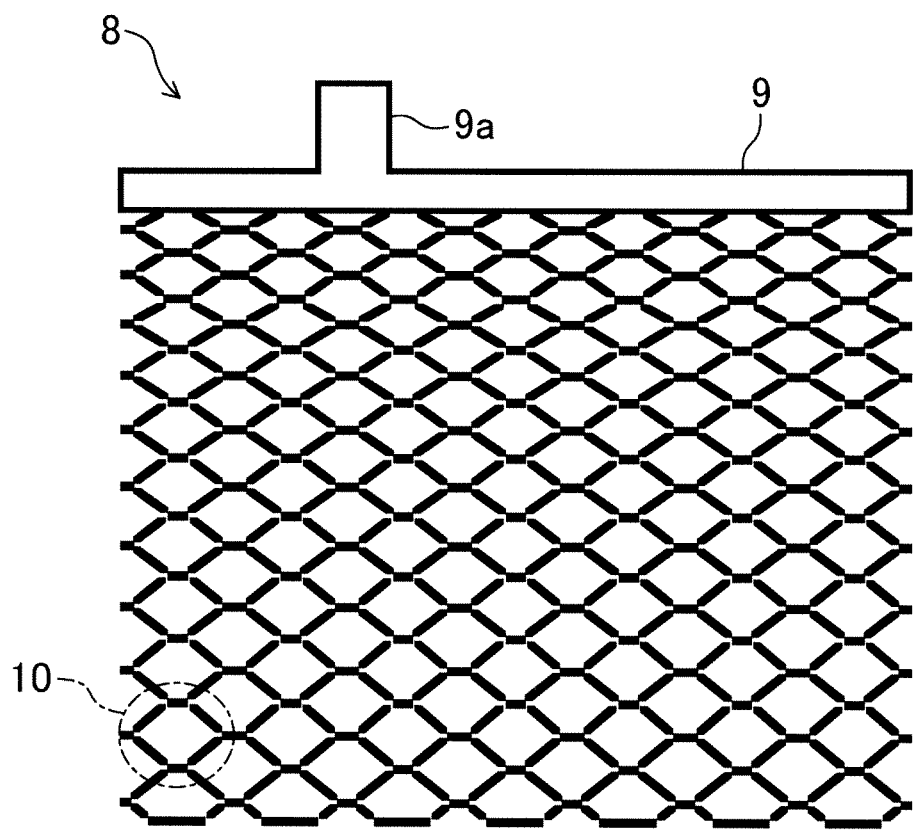
FIG. 2(a) illustrates one example of a positive electrode grid of the embodiment.

FIG. 1 illustrates a main portion (an electrode plate unit) of a lead-acid battery of this embodiment. FIG. 2 illustrates one example of a positive electrode grid of this embodiment. An electrode plate unit 1 includes a positive electrode plate 1a, a negative electrode plate 1b, and a separator 1c. The positive electrode plate 1a is a positive electrode grid filled with paste of lead suboxide powder, purified water, and dilute sulfuric acid. The main component of this lead suboxide powder is lead oxide. The negative electrode plate 1b is a negative electrode grid filled with paste of lead suboxide powder, purified water, dilute sulfuric acid, carbon black, barium sulfate, and lignin. The main component of this lead suboxide powder is also lead oxide. The carbon black, the barium sulfate, and the lignin serve as additives. The separator 1c is provided between the positive electrode plate 1a and the negative electrode plate 1b. A battery box 2 includes a plurality of cell compartments 3 separated by partitions 2a. Each of the cell compartments 3 accommodates the electrode plate unit 1. The electrode plate unit 1 is connected with a strap 4 (that is connected with a connection member 5). This connection member 5 is connected through the partition 2a with a next connection member 5 having the opposite polarity. In this manner, the electrode plate units 1 are connected in series as many as the number of the cell compartments 3. Each of the connection members 5 located on both ends of the series does not abut the connection member 5 having the opposite polarity. These connection members 5 on both ends are connected with binding posts (not shown). A lid 6 including a pair of bushings (not shown) is closed to seal the battery box 2. The bushings engage with the binding posts of the cell compartments 3 on both ends. The binding posts and the bushings are integrated by, e.g., welding to serve as a pair of terminals 7. A vent hole (not shown) is provided directly above each of the cell compartments 3. An electrolyte (not shown) is poured from this vent hole so that the level of the electrolyte is higher than that of the electrode plate unit 1. Then, the vent holes are sealed with vent plugs 6a. Then, the lead-acid battery is charged under a predetermined condition.

The positive electrode grid 8 of this embodiment is made of a lead or a lead alloy. This grid includes an upper frame 9 and a mesh. The upper frame 9 includes an edge 9a connected with the connection member 5. The mesh includes a plurality of gates 10 that are generally diamond-shaped. A lower frame may be provided on a lower part of the mesh to keep the structure solid. The negative electrode grid (not shown) has the same structure as the positive electrode grid 8.

This embodiment has two features. First, the gate 10 of the mesh of the positive electrode grid 8 is 50-100 mm$^2$ in area, preferably 65-85 mm$^2$ Second, the carbon black of the negative electrode plate 1b has a DBP oil absorption of 140-340 ml/100 g, preferably 150-200 ml/100 g.

Unlike a lithium ion secondary battery or a nickel hydrogen storage battery, a lead-acid battery includes paste, of lead suboxide powder, that does not include a thickener (PVDF, CMC, etc.). Thus, this paste has a low flowability as plaster does, and is inconvenient for filling and applying. In other words, the current collector includes the active material having a large variability per unit area. It is impossible to appropriately apply such paste on a grid including excessively small gates 10 (small spaces) or a grid including excessively large gates 10 (large spaces). Thus, the amount of the active material (lead suboxide powder) per unit area of the electrode plate varies in the inside of a single gate 10 or over multiple gates 10.

PATENT DOCUMENTS 1-4 disclose that the carbon black having a large amount of DBP oil absorption and a high conductivity, and the lignin in an appropriate amount not only improve the charge acceptance of the negative electrode plate, but also form a uniform conductive network, thereby reducing the resistance to a charge transfer, and improving the responsivity to discharging.

In contrast, the positive electrode plate 1a that is a positive electrode grid 8 including gates 10, each being excessively small or excessively large in area is unable to distribute the active material equally due to the filling variability. Thus, such a positive electrode plate has a stronger resistance to a charge transfer than the above improved negative electrode plate 1b does.

The lead-acid battery with the above improved negative electrode plate 1b is a long-life battery. However, this battery on a vehicle that has been left for a long time from a certain low SOC might generate a dark current discharge. In this case, an uneven distribution of the active material in the positive electrode plate 1a produces a significant effect. Specifically, the inside of the positive electrode plate 1a has a portion of a high weight ratio of the positive electrode grid 8 (more specifically, a grid (a strand) including a mesh), i.e., a portion of a low weight ratio of the active material. In this portion, the dark current discharge reaction proceeds more smoothly than in the other portions. Thus, this portion serves as a strong resistance to the reaction, thereby preventing a restart of the engine. Such an effect is unable to be found without exposing the lead-acid battery to the dark current discharge for a long time. This lead-acid battery includes the carbon black having a DBP oil absorption of 140-340 ml/100 g, and thus includes the negative electrode plate 1b having an improved charge acceptance.

The positive electrode grid 8 convenient for a uniform filling of an active material paste for the positive electrode plate 1a includes a mesh including gates, each being 50-100 mm$^2$ in area, preferably 65-85 mm$^2$. The positive electrode plate 1a including this mesh has a great uniformity of filling of paste and a small distribution variability of the active material. This positive electrode plate 1a combined with the negative electrode plate 1b including the carbon black having a DBP oil absorption of 140-340 ml/100 g provides a long-life lead-acid battery that is able to start an engine even when exposed to the dark current discharge for a long time after the SOC has been reduced by a repeat of a start of the engine.

The carbon black of the negative electrode plate 1b preferably has a DBP oil absorption of 150-200 ml/100 g. The carbon black having a DBP oil absorption of more than or equal to 150 ml/100 g makes the charge acceptance of the negative electrode plate 1b high. The carbon black having a DBP oil absorption of less than or equal to 200 ml/100 g keeps the structure of the active material solid. Accordingly, the life characteristics are further improved.

The negative electrode plate 1b preferably includes the carbon black of 0.05-0.7 mass percent, preferably 0.1-0.5 mass percent relative to the negative electrode active material. The amount of more than or equal to 0.05 mass percent makes the charge acceptance of the negative electrode plate 1b high. The amount of less than or equal to 0.7 mass percent keeps the structure of the active material solid. Accordingly, the life characteristics are further improved.

Moreover, the so-called liquid electrolyte lead-acid battery is preferable. The level of an electrolyte of this liquid electrolyte lead-acid battery is higher than that of the electrode plate unit 1. The liquid electrolyte lead-acid battery (as a starter battery for, in particular, an idle reduction vehicle) has many opportunities to repeat a large current discharge such as a start of the engine and to reduce the SOC. This battery that is mounted on a vehicle also has many opportunities to be exposed to a dark current discharge. Thus, this liquid electrolyte lead-acid battery is advantageous for this embodiment.

In this embodiment, a preferable amount of lignin compound of the negative electrode plate 1b is not limited to 0.1-0.6 mass percent of PATENT DOCUMENTS 1-4 relative to the negative electrode active material. A matter of first priority of this embodiment is the responsivity to discharging of the positive electrode plate 1a. In such an embodiment, the amount of lignin compound improving the charge acceptance of the negative electrode plate 1b is more dominant than the quality of the conductive network of the positive electrode plate 1a (the size of the gate 10 of the mesh of the positive electrode grid 8).

FIG. 2 illustrates that the area of the gate 10 of the mesh varies from the upper frame 9 to the bottom. Note that the maximum of this area is less than or equal to the double of the minimum. In this case, the average of this area may serve as "the area of the gate 10." Only a portion, of the mesh, that is in contact with the upper frame 9 includes gates 10, each having half a generally diamond-shaped area. These gates are few in number, and produce no noticeable effect. Thus, these gates are not defined as "the area of the gate 10" in this embodiment.

Figure 2B:
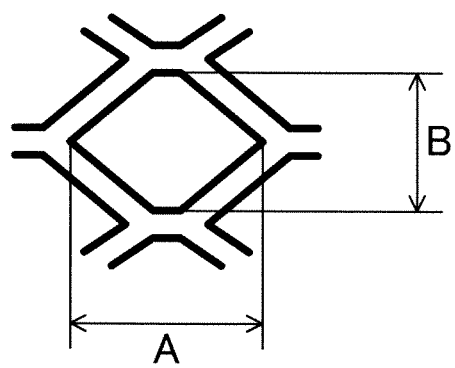
FIG. 2(b) is an enlarged view of a part of the positive electrode grid.

The area of the gate 10 in FIG. 2(b) is calculated by $A \times B$. The area of the gate 10 is controlled by adjusting a mold that is used to produce the positive electrode grid 8 by the casting method. The area of the gate 10 is also controlled by adjusting a cutting width and an expansion dimension of a lead alloy sheet, which is a raw material.

The numerical value of DBP oil absorption of the carbon black may be specified with only one material. For example, the value of 178 ml/100 g may be specified with only "VULCAN (a trademark) XC-72" (BK) of Cabot Corporation. The BK has a DBP oil absorption of 178 ml/100 g. Alternatively, the numerical value may be varied with multiple materials. For example, the BK and "KETJENBLACK (a trademark) EC" (KB) of Lion Corporation may be appropriately mixed to specify any value of 178-350 ml/100 g. The KB has a DBP oil absorption of 350 ml/100 g.

EXAMPLES

Example 1

A positive electrode plate 1a including an edge 9a and an upper frame 9 was produced as follows. An expanded sheet serving as a positive electrode grid 8 was produced by expanding a calendered sheet of a lead-calcium alloy by the reciprocating method and adjusting a cutting width and an expansion dimension of the calendered sheet. The positive electrode grid 8 includes a mesh including a plurality of gates 10. Each of the gates 10 is generally diamond-shaped and 50 mm² in area. A paste was produced by mixing lead suboxide powder, sulfuric acid, and purified water. The main component of the lead suboxide powder was lead oxide. The positive electrode grid 8 was filled with this paste. Then, this positive electrode grid 8 was cut in the predetermined dimension and was dried.

A negative electrode plate 1b including an edge 9a and an upper frame 9 was produced as follows. An expanded sheet serving as a negative electrode grid was produced by expanding a calendered sheet of a lead-tin-calcium alloy by the reciprocating method. Lignin compound of 0.15 mass percent, barium sulfate of 1.0 mass percent, and carbon black of 0.3 weight percent relative to the lead suboxide powder were added to the negative electrode grid. The main component of the lead suboxide powder was lead oxide. The average of DBP oil absorption of the carbon black was 185 ml/100 g by mixing BK and KB. The negative electrode grid was filled with a paste produced by mixing sulfuric acid with purified water. Then, this negative electrode grid was cut in the predetermined dimension and was dried.

An electrode plate unit 1 was produced by providing the positive electrode plate 1a and the negative electrode plate 1b face to face, and providing a microporous separator 1c between the positive electrode plate 1a and the negative electrode plate 1b. The microporous separator 1c was mainly made of a polyethylene resin. A battery box 2 of polypropylene (PP) included six cell compartments 3 separated by partitions 2a. Each of the six electrode plate units 1 was accommodated in each of the cell compartments 3. The electrode plate units 1 were connected in series together through straps 4 and connection members 5. Binding posts of the electrode plate units 1 on both ends were connected to one of polarities.

The battery box 2 was sealed by a lid 6. This lid 6 was made of PP and included bushings. A pair of terminals 7 were produced by engaging, welding, and integrating the binding posts and the bushings. A predetermined dilute sulfuric acid (an electrolyte) was poured from a vent hole provided directly above each of the cell compartments 3 so that the level of the electrolyte was higher than that of the electrode plate unit 1. The vent hole was sealed with a vent plug 6a. Then, the battery was charged under a predetermined condition. In this manner, 80D26 defined by JIS D5103 (lead-acid starter battery) was produced.

Examples 2-5

Lead-acid batteries were all produced in a similar manner of Example 1 except for the area of the gate 10 of the mesh of the positive electrode grid 8. The area of the gate 10 was 65 mm² (Example 2), 75 mm² (Example 3), 85 mm² (Example 4), or 100 mm² (Example 5).

Comparison Examples 1 and 2

Lead-acid batteries were all produced in a similar manner of Example 1 except for the area of the gate 10 of the mesh of the positive electrode grid 8. The area of the gate 10 was 45 mm² (Comparison Example 1) or 110 mm² (Comparison Example 2).

Comparison Example 3

A lead-acid battery was all produced with the positive electrode grid 8 of Example 3 in a similar manner of Example 3 except for an average of DBP oil absorption of carbon black added to the negative electrode paste. The "Denkablack (a trademark)" (DB) of DENKI KAGAKU KOGYO has a DBP oil absorption of 115 ml/100 g. The DB and BK were mixed together and used as carbon black having the average of 130 ml/100 g.

Examples 6-8

Lead-acid batteries were all produced with the positive electrode grid 8 of Example 3 in a similar manner of Example 3 except for an average of DBP oil absorption of carbon black added to the negative electrode paste. The DB and BK were mixed together and used as carbon black having the average of 140 ml/100 g (Example 6), 150 ml/100 g (Example 7), or 170 ml/100 g (Example 8).

Examples 9-11

Lead-acid batteries were all produced with the positive electrode grid 8 of Example 3 in a similar manner of Example 3 except for an average of DBP oil absorption of carbon black added to the negative electrode paste. The BK and KB were mixed together and used as carbon black having the average of 200 ml/100 g (Example 9), 270 ml/100 g (Example 10), or 340 ml/100 g (Example 11).

Comparison Example 4

A lead-acid battery was all produced with the positive electrode grid 8 of Example 3 in a similar manner of Example 3 except for the amount of DBP oil absorption of carbon black added to the negative electrode paste. Only KB was used as carbon black having 350 ml/100 g.

Examples 12-17

Lead-acid batteries were all produced with the positive electrode grid 8 of Example 3 in a similar manner of Example 3 except for the amount of carbon black added to the negative electrode paste. The carbon black was 0.03 mass percent (Example 12), 0.05 mass percent (Example 13), 0.1 mass percent (Example 14), 0.5 mass percent (Example 15), 0.7 mass percent (Example 16), or 0.8 mass percent (Example 17) relative to lead suboxide powder (a negative electrode active material).

Example 18

A lead-acid battery was all produced with the positive electrode grid of Example 3 in a similar manner of Example 3 except for the amount of lignin compound added to the negative electrode paste. The amount of lignin compound was 0.05 mass percent.

A complex cycle life test for combination of a dark current discharge and an engine start was conducted on each of these lead-acid batteries. Specifically, this test where a four-minute discharge of the "light-load life test" of JIS D5103 was replaced with a two-minute discharge was conducted in a thermostat at 80° C. More specifically, each sample was discharged at 25 A for two minutes and at a constant voltage of 14.8V (the maximum current of 25 A) for ten minutes. This cycle was repeated 480 times. Every 480 cycles, the sample in a thermostat at 25° C. was discharged at 0.1 A for two weeks. Then, the sample was discharged at 490 A for 30 seconds. Then, the sample having the terminal voltage of less than or equal to 7.2V was assessed as dead. Table 1 shows conditions and results.

TABLE 1

| | | Gate Area (mm$^2$/gate) | Carbon Black | | Lignin | Life Characteristics |
| | | | DBP Oil Absorption (ml/100 g) | Amount (mass %) | Amount (mass %) | (Cycle Numbers) |
|---|---|---|---|---|---|---|
| Example | 1 | 50 | 185 | 0.3 | 0.15 | 5760 |
| Example | 2 | 65 | 185 | 0.3 | 0.15 | 6240 |
| Example | 3 | 75 | 185 | 0.3 | 0.15 | 7200 |
| Example | 4 | 85 | 185 | 0.3 | 0.15 | 6240 |
| Example | 5 | 100 | 185 | 0.3 | 0.15 | 5760 |
| Example | 6 | 75 | 140 | 0.3 | 0.15 | 5760 |
| Example | 7 | 75 | 150 | 0.3 | 0.15 | 6240 |
| Example | 8 | 75 | 170 | 0.3 | 0.15 | 6240 |
| Example | 9 | 75 | 200 | 0.3 | 0.15 | 6240 |
| Example | 10 | 75 | 270 | 0.3 | 0.15 | 5760 |
| Example | 11 | 75 | 340 | 0.3 | 0.15 | 5760 |
| Example | 12 | 75 | 185 | 0.03 | 0.15 | 5760 |
| Example | 13 | 75 | 185 | 0.05 | 0.15 | 6240 |
| Example | 14 | 75 | 185 | 0.1 | 0.15 | 6720 |
| Example | 15 | 75 | 185 | 0.5 | 0.15 | 6720 |
| Example | 16 | 75 | 185 | 0.7 | 0.15 | 6240 |
| Example | 17 | 75 | 185 | 0.8 | 0.15 | 5760 |
| Example | 18 | 75 | 185 | 0.3 | 0.05 | 6720 |
| Comparison Example | 1 | 45 | 185 | 0.3 | 0.15 | 4320 |
| Comparison Example | 2 | 110 | 185 | 0.3 | 0.15 | 4320 |
| Comparison Example | 3 | 75 | 130 | 0.3 | 0.15 | 3840 |
| Comparison Example | 4 | 75 | 350 | 0.3 | 0.15 | 3840 |

The positive electrode grid 8 of Comparison Example 1 includes the gate 10 that is 45 mm$^2$ in area. The positive electrode grid 8 of Comparison Example 2 includes the gate 10 that is 110 mm$^2$ in area. The samples of these comparison examples have poor startability after the dark current discharge. Such a gate 10 that is excessively large or excessively small varies the uniformity of filling of the paste of an active material (the distribution of an active material). If the negative electrode plate 1*b* has a good conductive network in its inside, this variation reduces the resistance to the dark current discharge performed from a low SOC.

The carbon black of Comparison Example 3 has a DBP oil absorption of less than 140 ml/100 g. The carbon black of Comparison Example 4 has more than 340 ml/100 g of DBP oil absorption. The samples of these comparison examples have poor life characteristics. To improve the life characteristics with a high charge acceptance of the negative electrode, the carbon black needs to have an appropriate range of the amount of DBP oil absorption. An excessively small amount of DBP oil absorption causes an insufficient conductive network in the negative electrode plate 1b. An excessively large amount of DBP oil absorption reduces the retention of the active material in the negative electrode plate 1b.

In contrast to these comparison examples, the samples of the other examples include the gates 10, each being 50-100 mm² in area. These samples also include the carbon black having a DBP oil absorption of 140-340 ml/100 g. Accordingly, these samples have both good life characteristics and a good startability after the dark current discharge. The gate 10 that is 65-85 mm² in area and the carbon black having 150-200 ml/100 g of oil absorption are more advantageous to the life characteristics and startability.

From the results of life characteristics, the carbon black is preferably 0.05-0.7 mass percent relative to the negative electrode active material, and more preferably 0.1-0.5 mass percent. It is conceivable that the effect on the life characteristics by the amount of carbon black is based on the same mechanism of the amount of DBP oil absorption of carbon black.

The lignin compound of Example 3 is 0.15 mass percent relative to the negative electrode active material. The lignin compound of Example 18 is 0.05 mass percent relative to the negative electrode active material. The samples of these examples have the same startability after the dark current discharge. A matter of first priority of this embodiment is to adjust the balance of the conductive network between the positive electrode plate 1a and the negative electrode plate 1b. Thus, the lignin compound that does not directly relate to this matter is not advantageous (but advantageous to only the charge acceptance).

INDUSTRIAL APPLICABILITY

The lead-acid battery of the present invention, which is widely applicable to starter batteries on vehicles, is industrially very useful.

DESCRIPTION OF REFERENCE CHARACTERS

1 Electrode Plate Unit
1a Positive Electrode Plate
1b Negative Electrode Plate
1c Separator
2 Battery Box
2a Partition
2b Side Wall
3 Cell Compartment
4 Strap
5 Connection Member
6 Lid
6a Vent Plug
7 Terminal
8 Positive Electrode Grid
9 Upper Frame
9a Edge
10 Gate

The invention claimed is:

1. A lead-acid battery, comprising:
electrode plate units, each including a positive electrode plate, a negative electrode plate, and a separator, wherein:
the positive electrode plate is a positive electrode grid filled with paste including powder of lead oxide as a main component,
the negative electrode plate is a negative electrode grid filled with paste including powder of lead oxide as a main component, and including carbon black,
the positive electrode plate faces the negative electrode plate,
the separator is provided between the positive electrode plate and the negative electrode plate,
the positive electrode grid includes gates, each being generally diamond-shaped, and being more than or equal to 50 mm² and less than or equal to 100 mm² in area,
the carbon black has a DBP oil absorption of more than or equal to 140 ml/100 g and less than or equal to 340 ml/100 g, and
the negative electrode plate includes a lignin compound in an amount of 0.05 mass percent to 0.15 mass percent relative to the negative electrode active material.

2. The lead-acid battery of claim 1, wherein
the positive electrode grid includes gates, each being generally diamond-shaped, and being more than or equal to 65 mm² and less than or equal to 85 mm² in area.

3. The lead-acid battery of claim 1, wherein
the carbon black has a DBP oil absorption of more than or equal to 150 ml/100 g and less than or equal to 200 ml/100 g.

4. The lead-acid battery of claim 1, wherein
the carbon black is more than or equal to 0.05 mass percent and less than or equal to 0.7 mass percent relative to the negative electrode active material.

5. The lead-acid battery of claim 1, wherein
the carbon black is more than or equal to 0.1 mass percent and less than or equal to 0.5 mass percent relative to the negative electrode active material.

6. The lead-acid battery of claim 1, wherein
a level of an electrolyte is higher than that of the electrode plate unit.

7. The lead-acid battery of claim 1, wherein the carbon black includes first carbon black and second carbon black having the DBP oil absorption different from the first carbon black.

8. The lead-acid battery of claim 1, wherein the carbon black includes first carbon black and second carbon black having the DBP oil absorption different from the first carbon black.

* * * * *